June 19, 1934.  L. G. SIMJIAN  1,963,176
SELF PHOTOGRAPHING APPARATUS
Filed Nov. 2, 1931  2 Sheets-Sheet 2
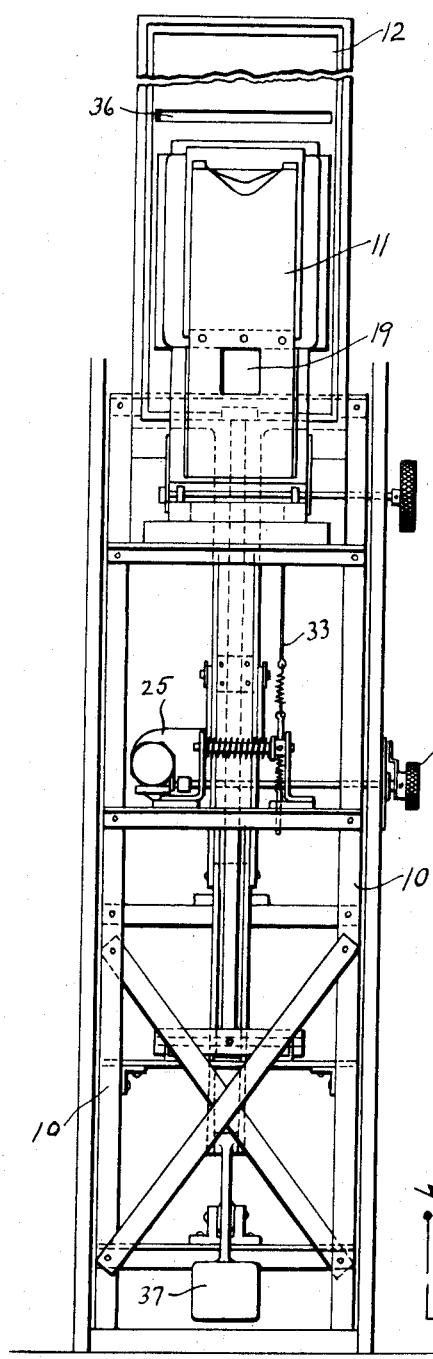
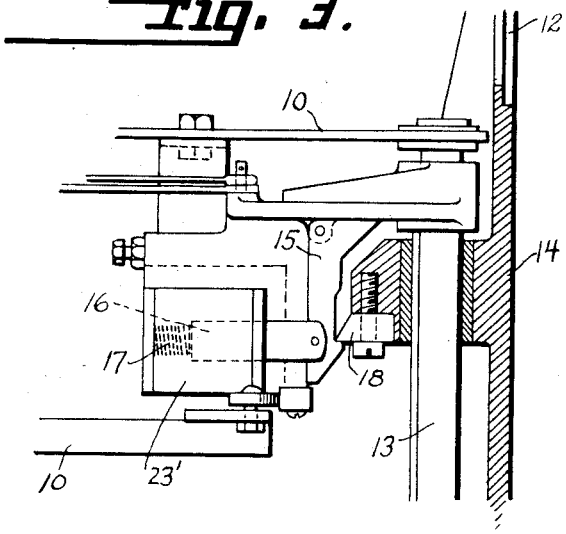
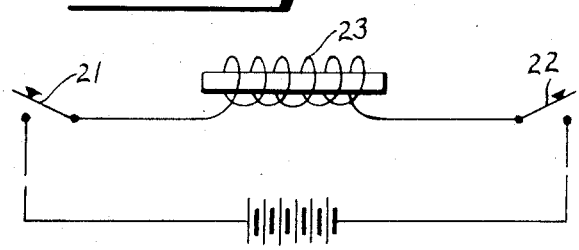

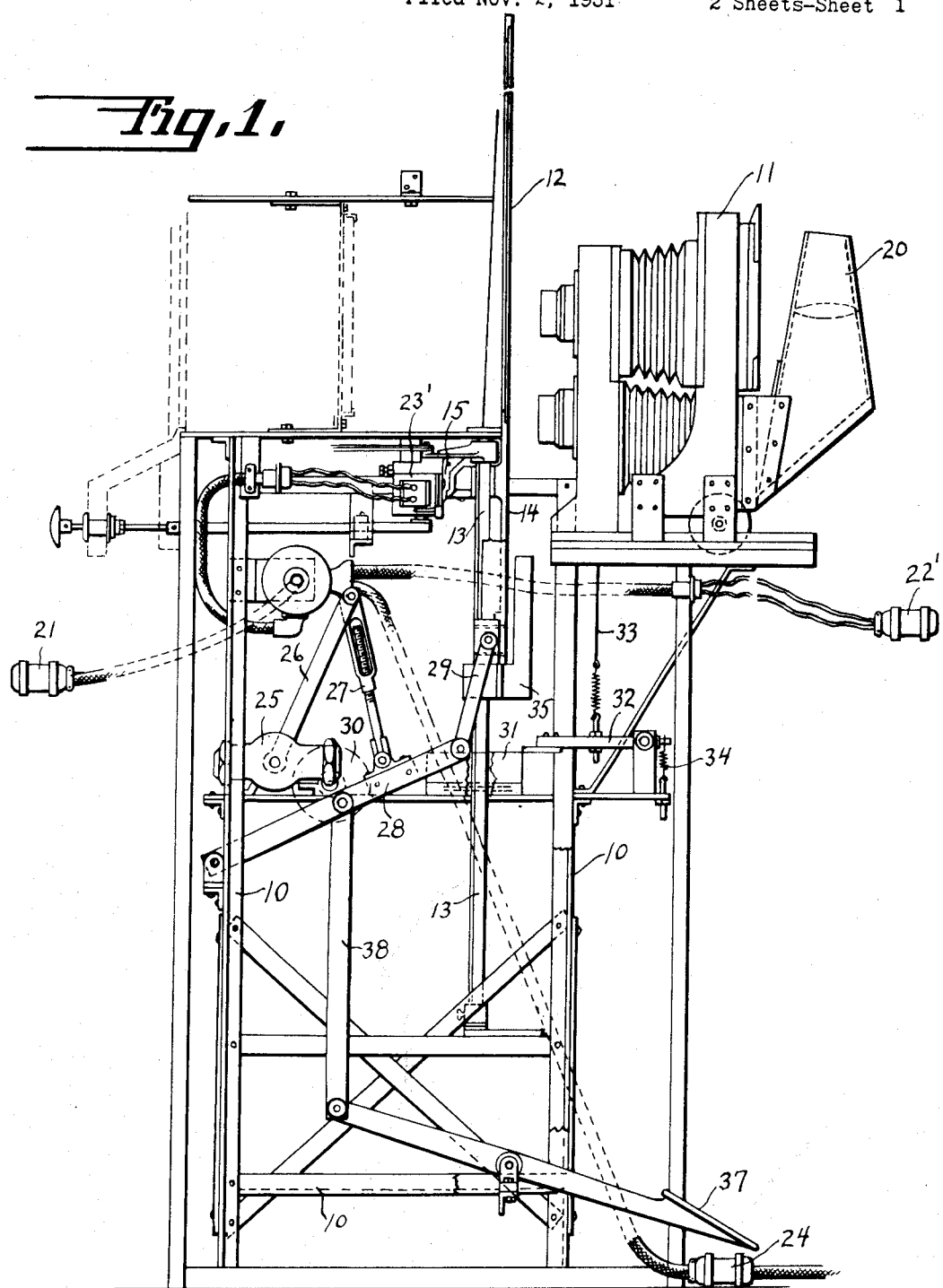

Patented June 19, 1934

1,963,176

UNITED STATES PATENT OFFICE 1,963,176

SELF-PHOTOGRAPHING APPARATUS

Luther G. Simjian, New Haven, Conn.

Application November 2, 1931, Serial No. 572,626

8 Claims. (Cl. 88—1)

This invention relates in general to photographic apparatus and more particularly to photographic apparatus adaptable for use in pose reflecting systems of self-photography. The apparatus is especially suited to a system of self-photography, such as is described and claimed in Letters Patent No. 1,709,598, dated April 16th, 1929, and in pending application Serial No. 542,070, filed June 4th, 1931, though not so limited.

One of the objects of the present invention is to provide an apparatus of this type in which the operator of the camera may observe the focus without disturbing the poser, who remains entirely free to place himself or herself before the mirror in a position to appear to the best advantage. A further object is to provide a means for initially controlling the operation of the photographic apparatus, so that cooperation between the camera operator and the poser is necessary before the picture can be taken, thus assuring a higher quality finished photograph of the subject.

My invention also contemplates the provision of a means responsive to the movement of the mirror to operate the camera mechanism utilized in the photographic system. Another object is to provide a mechanism which may be regulated to control the speed of the movement of the mirror during the operation of the system, so that the time interval, necessary to take the photograph, may be governed at will. This mechanism is preferably operative to maintain the movement of the mirror at a uniform rate of speed throughout its travel.

A further object is to provide a reset mechanism by which the mirror can readily be returned to its initial operative position. Still another object is to provide a mechanism controlled through the simultaneous action of the poser and operator to effect a release of the mirror to instigate the operation of the photographic system. A further object is to provide a simple and convenient pose-reflecting system for photographic apparatus, which will enable a person being photographed to observe the image the camera will photograph prior to the operation of the same.

Other objects and improvements achieved by the invention will become apparent as the description proceeds.

Referring to the drawings:

Fig. 1 is a side elevation of an assembled apparatus made in accordance with the present invention.

Fig. 2 is a rear elevation of the apparatus as shown in Fig. 1.

Fig. 3 is an enlarged detail view of the electrically operative release mechanism of the mirror, and Fig. 4 is a diagrammatic view of the electrical circuit for operating the mirror release mechanism.

In carrying out my invention, as shown in Figs. 1 and 2, I employ a suitable frame work, indicated generally at 10, upon which is adjustably mounted to the rear of the same a camera mechanism as indicated at 11. Included as a portion of the frame work structure, I employ a suitable guide means for the vertical control of the position of a mirror 12, the construction here employed being guide rods 13 and slide element 14 upon which the mirror is mounted. The mirror extends above the frame work of the apparatus and is located adjacent to and in front of the camera mechanism 11. The movement of the mirror when descending from its upper limiting position is effected by the action of gravity and is controlled by a mechanism to govern the speed of such movement as will hereinafter be more particularly described.

Referring to Figs. 1 and 3, the release mechanism which normally maintains the slide element of the mirror at the upper limit of its travel with respect to the guide rod 13, is illustrated herein as a pivotable dog or catch member 15 the position of which is controlled by the plunger 16 of a solenoid. The plunger is suitably actuated by a spring 17 or otherwise to normally maintain the pivotable catch element 15 in a position to cooperate with a projecting element or shoulder 18 associated with the slide 14, to maintain the mirror in its highest vertical position. In this position of the mirror the operator of the apparatus is enabled to focus the camera which is in back of the mirror through the opening or aperture 19 (Fig. 2) by means of a viewing device 20 such as is employed in the ordinary camera. The poser is unaware of the focusing of the operator and adapts himself or herself to a position before the mirror or system of mirrors in which the image created therein appears in the best form. For the purpose of obtaining different views of the subject being photographed the system of mirrors shown and described in detail in my pending application Serial No. 542,070, filed June 4th, 1931, is particularly useful.

Referring to Figs. 1, 3 and 4 a means for controlling the initial operation of the photographic apparatus is shown in the form of an electric circuit (Fig. 4) in which is preferably employed a pair of switches, one of which is indicated at 21 and the other at 22, a solenoid 23 and a battery or other suitable source of electrical energy. The switches 21 and 22 are arranged in series so that in order to close the circuit to effect the operation of the solenoid 23 both of the switches must be in a closed position. The corresponding elements as employed in the photographic apparatus are shown as a push button circuit closer 21' for use by the poser and a push button circuit closer 22' for use by the operator, the solenoid being indicated at 23' having the plunger 16 hereinbefore described associated with the same, and the source of electrical energy which in this instance is obtained from the house mains through a floor plug 24.

From the foregoing description it will now be understood that the mechanism for releasing the mirror from its raised position is only operative when both the poser and operator cooperate in closing the circuit containing the solenoid. The plunger 16 of the solenoid 23' in this event is moved against the action of the spring 17, withdrawing the pivotable catch element 15 so that the mirror is permitted to drop by action of gravity, the slide element 14 moving along its guide rods 13.

Referring more particularly to Figs. 1 and 2 the mechanism which I employ in regulating the descending speed of the mirror is preferably in the nature of the usual door closing mechanism. The mechanism indicated at 25 is suitably fastened to the framework of the apparatus and is connected by means of a system of links to the slide element 14. This system of pivotable links consists of an arm 26 extending from the stop mechanism, an adjustable arm 27, an arm 28 one end of which is pivotably connected to a bracket located on the frame work of the apparatus and an arm 29 connecting the other end of the arm 28 to the slide element 14 upon which the mirror is mounted. The speed with which the arm 26 rotates under the constant weight of the mirror as the same moves in a downward direction can be regulated by means of an air valve employed for this purpose in the stop mechanism. This regulation may be effected by adjusting the indicator knob 30 associated with the door closing mechanism. The degree of resistance to the downward movement of the mirror can consequently be regulated so that the time required for a complete movement may be governed. A uniform descending speed of the mirror can also be effected. The downward movement of the mirror is limited by a soft and suitably provided stop as indicated at 31 upon which the lower portion of the slide element 14 comes to rest.

A trip mechanism for operating the shutter of the camera is actuated during the descending movement of the slide element 14 just prior to coming to rest against the stop 31. This mechanism is herein illustrated in the form of a balanced pivotable arm 32 mounted on the frame work of the apparatus in a suitable manner. This arm is yieldingly connected to the shutter of the camera on one side of the pivot point by means of a connection 33 and on the other side of the pivot point to a fixed portion of the frame work by means of the connection 34. One end of the arm 32 extends so that the shoulder 35 of the slide element 14 contacts with the same before it comes to rest, causing the arm 32 to pivot and operate the shutter of the camera through the connection 33. The mirror 12 is provided with a slot 36 which is adjacent the lens of the camera as the trip member is actuated so that the photograph of the poser is obtained.

Provision is also made so that the slide element upon which the mirror is mounted can be readily returned to its initial operative position (Fig. 3). A foot pedal 37 having an arm pivotally connected to the frame of the apparatus and associated with the arm 28 by means of a connecting arm 38 enables the operator to raise the mirror against the action of gravity to a point where the release mechanism maintains the same in position.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means.

Having described my invention, what I claim and desire to secure by Letters Patent is:

1. In a pose reflecting photographing system, a slidably mounted mirror having an aperture therein, a camera behind the mirror, manually operable means for releasing said mirror and permitting it to fall, and means for maintaining a slow and uniform velocity of descent so that the poser will not be startled thereby.

2. In a pose reflecting photographing system, a slidably mounted mirror having an aperture therein, a camera behind the mirror, manually operable means for releasing said mirror and permitting it to fall, means for maintaining a uniform velocity of descent, and adjustable means for automatically regulating said uniform velocity of descent.

3. In a pose reflecting photographing system, a slidably mounted mirror having an aperture therein, a camera behind the mirror having a shutter, manually operable means for releasing said mirror and permitting it to fall to bring said aperture in front of said camera, a trip adapted to be operated by the descent of the mirror, and means connecting said trip and shutter for operating the latter.

4. In a system of pose reflecting photography, a slidably mounted mirror having an observation aperture and a photographic aperture therein, an observation apparatus positioned so that the operator may see the subject through said first-named aperture, a camera positioned below said second-named aperture, and means for dropping the mirror whereby the photograph is taken as the second-named aperture passes the camera.

5. In a system of pose reflecting photography, a slidably mounted mirror having an observation aperture and a photographic aperture therein, an observation apparatus positioned so that the operator may see the subject through said first-named aperture, a camera positioned below said second-named aperture, and interlocking means under the control of the operator and subject for dropping the mirror.

6. In a self-photographing system, a slidably mounted mirror having an aperture therein, a camera behind the mirror, means operable by the poser for releasing said mirror and permitting it to fall to bring said aperture in front of said camera, and other means operable from behind the mirror by the operator for resetting the mirror including a treadle and lever mechanism connecting said treadle and mirror.

7. In a pose reflecting photographing system, a slidably mounted mirror having an aperture therein, a camera behind the mirror, a latch for normally holding said mirror in an elevated position, electro-magnetic means for releasing said latch to permit said mirror to fall, adjustable means for regulating the descent of the mirror and maintaining the descent uniform, and an electrical push button for operation by either the subject or operator to operate said magnetic means.

8. In a self-photographing system, a slidably mounted mirror having an aperture therein, a camera behind the mirror, a latch for normally holding said mirror in an elevated position, electro-magnetic means for releasing said latch to permit said mirror to fall, and interlocking switches for operation by the subject and operator respectively to operate said magnetic means.

LUTHER G. SIMJIAN.